Figure 1:
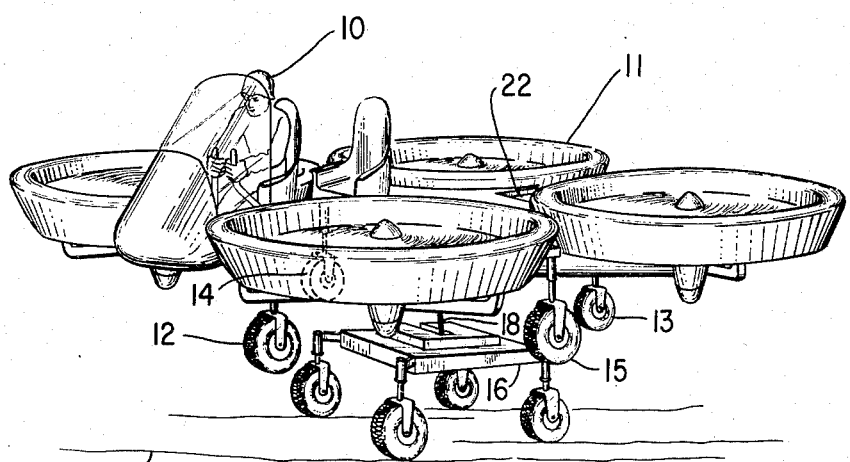

Oct. 4, 1960 R. VOGT 2,954,614

FLIGHT TRAINING APPARATUS FOR HOVERING TYPE AIRCRAFT

Filed Dec. 2, 1957

*INVENTOR.*
RICHARD VOGT

United States Patent Office 2,954,614
Patented Oct. 4, 1960

2,954,614

FLIGHT TRAINING APPARATUS FOR HOVERING TYPE AIRCRAFT

Richard Vogt, Santa Barbara, Calif., assignor, by mesne assignments, to Curtiss-Wright Corporation, a corporation of Delaware Filed Dec. 2, 1957, Ser. No. 700,121

2 Claims. (Cl. 35—12)

This invention relates generally to flight training apparatus and more particularly to an improved structure for facilitating the training of pilots for flying hovering type aircraft such as helicopters and the like.

The technique and skill required to operate helicopters and other types of aircraft capable of hovering are quite different from those required for piloting conventional aircraft. Since the hovering type aircraft such as the helicopter is relatively expensive as compared to conventional aircraft of the same capacity, it is important to minimize the risks of damage during a training operation. Further, the safety of the trainee himself is of paramount importance.

Accordingly, it has been the practice to construct rather complicated and expensive training apparatus usually involving overhead booms, cables, and the like for suspending the aircraft and yet enabling the same to be operated relatively safely within the confines of the apparatus. While such apparatus has been fairly successful, there is little opportunity for the pilot to experience the actual "feel" of the flying machine when under the influence of such a harness. Further, the reaction of the aircraft under different loads and during forward flight conditions cannot easily be simulated with present day training structures.

Bearing the above in mind, it is a primary object of the present invention to provide an extremely inexpensive training apparatus which will minimize the possibility of damage to a hovering type aircraft as well as possible injury to the trainee and yet will permit to be carried out most of the elementary flying maneuvers of which the craft is capable.

More particularly, it is an object to provide a training apparatus of the above type in which a trainee pilot may gain experience in the feel of the aircraft under different load conditions as well as in forward, sidewise, and rear flight directions.

Another object is to provide a training apparatus which does not involve any overhead structures, is relatively compact, and may be produced in great numbers at a minimum of cost.

Still another object is to provide an improved training apparatus which is extremely simple to assemble requiring nothing more than a single manual operation which may be readily effected by the trainee himself.

These, and many other objects and advantages of the present invention are attained by providing a weighted cart with suitable rollers such that it may move in any desired direction about a cleared area. The cart is heavier than the maximum lifting force of which the aircraft is capable. A flexible line is secured between the cart and the hovering type aircraft and is of a length such as to limit the height at which the aircraft may be flown to a distance less than that which would cause damage should the lift characteristics of the aircraft fail. In other words, the line is in the neighborhood of only a few feet, such that the aircraft may actually lift two or three feet above the ground and be held in this position by the line. The trainee within the aircraft is thus entirely safe and he may actually tilt the craft within contemplated limits and effect forward flight, the cart itself simply trailing along on its rollers over the ground.

By providing individual weights, mass may be transferred from the cart to the helicopter and thus different conditions of load in the helicopter itself, as would actually obtain when the fuel tanks are empty or full, may be simulated.

Figure 2:
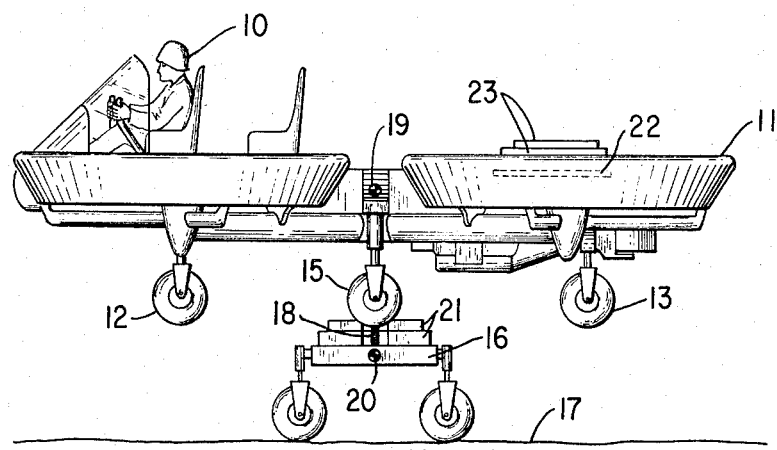

A better understanding of the invention will be had by referring to a preferred embodiment thereof as illustrated in the accompanying drawings in which:

Figure 1 is a perspective view illustrating a hovering type aircraft together with the training apparatus of the present invention; and, Figure 2 is a side elevational view of the structure illustrated in Figure 1.

Referring to Figure 1, there is illustrated, by way of example, a pilot trainee 10 seated within a hovering type aircraft 11. The aircraft 11 includes fore and aft landing gear 12 and 13, and laterally extending landing gear 14 and 15. In some types of hovering aircraft, the landing gear may take the form of closely spaced skis or other types of structures. It is possible, however, for the purposes of training, to provide temporary landing gear of the type illustrated in Figure 1, adapted to engage the ground at widely spaced points.

The training apparatus itself comprises a roller means in the form of a small cart 16 adapted to roll along the ground 17, in any desired direction. To this end, the rollers, while shown schematically may be in the form of castors or the like capable of a "trailer effect" so that any direction may be followed by the cart. As shown, there is provided a flexible line 18 which may be a light cable secured between the cart 16 and the aircraft 11.

As shown best in Figure 2, the upper end of the line 18 is preferably secured substantially at the center of gravity 19 of the aircraft 11 and the lower end is preferably secured substantially at the center of gravity 20 of the cart. By securing the line in this manner, no rotating moments on either the cart or the aircraft with respect to the center of gravity can be established, and the aircraft will essentially stay in a level position, other factors being equal, regardless of the tension in the line 18. Similarly, in order to remove any one of the wheels of the cart from the ground the tension in the line 18 must exceed the total weight of the cart.

As shown in Figures 1 and 2, the cart may be provided with a series of individual weights 21. The cart itself is designed to have a weight which exceeds the maximum lift forces of which the hovering type aircraft is capable so that with the cable attached as shown, the vertical height that the aircraft can fly is limited by the cable length. The weights 21, however, provide an added safety factor in the event of unforeseen winds and the like. Further, these weights may be individually transferred to the helicopter itself to simulate conditions of completely loaded fuel tanks and empty tanks.

As mentioned, the length of the cable 18 will determine the maximum height at which the aircraft 11 can fly. Preferably, this height is less than that distance at which the aircraft would be damaged if all of the lift was suddenly reduced to zero. By this arrangement, the possibility of damage to the aircraft should any of its power plants fail is minimized. Further, the provision of the widely spaced landing gears 12, 13, 14 and 15, is such that they engage the ground at points surrounding the cart so that should the pilot execute a banking maneuver, the degree of bank will be checked by one of the lateral landing gears engaging the ground before the craft slips into an unstable roll condition. The same safety feature is afforded by the fore and aft landing gear 12 and 13 in the event the craft is caused to pitch beyond its designed limits.

The operation of the training device will be evident from the above description. Initially, the aircraft is resting on the ground with the small cart 16 disposed directly thereunder. A length of flexible cable 18 is then provided which will limit the initial height at which the aircraft is flown to a few feet. The cable is then carefully secured to the point 19 on the aircraft and the pilot may then simply take off in a normal manner. The pilot can thus experiment with various maneuvers without running any risk of damaging either himself or the aircraft. If he wishes to attempt forward flight, he may do so by pitching the nose of the craft forward a small distance. Forward movement of the craft itself will simply pull the cart 16 along with it in any direction which the craft may take and thus experience is gained in the actual flying of the aircraft.

As the pilot trainee gains experience, the length of the cable 18 may be increased. The various individual weights 21 in the cart 16, may be transferred to a pocket 22 in the helicopter as indicated by the weights 23 in Figure 2 to enable the pilot to experience the feel of the aircraft under different loading conditions.

From the foregoing description, it will be evident that the present invention provides an extremely simple and effective training device for hovering type aircraft. Not only is the structure itself simple, small, and inexpensive to manufacture, but it also enables a more versatile training program to be carried on with absolute safety to both aircraft and the pilot.

Modifications that fall within the scope and spirit of the present invention will readily occur to those skilled in the art. The training apparatus is therefore not to be thought of as limited to the specific embodiment chosen for illustrative purposes.

What is claimed is:
1. An apparatus for training pilots to fly hovering type aircraft, comprising, in combination: roller means adapted to move along the ground, said roller means having a weight greater than the maximum lift force of said aircraft; and a flexible line secured at one end to said aircraft at substantially the center of gravity of said aircraft and having its other end secured to said roller means at substantially the center of gravity of said roller means, said line having a length predetermined such as to limit the vertical height at which said aircraft can fly above said roller means from the ground to a distance less than would cause damage to said aircraft should its said lift force drop to zero.

2. An apparatus for training pilots to fly hovering type aircraft, comprising, in combination: a vehicle having rollers for movement along the ground in any direction, said vehicle having a weight greater than the maximum lift force of said aircraft; a flexible line secured at substantially the center of gravity of said aircraft at one end and to said vehicle at its other end, said aircraft having a laterally extending landing gear positioned to engage the ground at spaced points on either side of said roller means without physical contact with said roller means, said line having a length predetermined such as to limit the vertical height at which said aircraft can fly above the ground to a distance less than would cause damage to said aircraft should its said lift force drop to zero.

References Cited in the file of this patent
UNITED STATES PATENTS

| | | |
|---|---|---|
| 1,397,998 | Zurovec | Nov. 22, 1921 |
| 1,825,363 | Robertson | Sept. 29, 1931 |
| 1,935,271 | Krell | Nov. 14, 1933 |
| 2,318,260 | Sikorsky | May 4, 1943 |
| 2,453,857 | Platt et al. | Nov. 16, 1948 |
| 2,471,544 | Ring | May 31, 1949 |
| 2,730,398 | Huested | Jan. 10, 1956 |

FOREIGN PATENTS

| | | |
|---|---|---|
| 748,059 | Great Britain | Apr. 18, 1956 |